United States Patent
Min et al.

(10) Patent No.: US 10,296,793 B2
(45) Date of Patent: May 21, 2019

(54) DEEP 3D ATTENTION LONG SHORT-TERM MEMORY FOR VIDEO-BASED ACTION RECOGNITION

(71) Applicant: NEC Laboratories America, Inc., Princeton, NJ (US)

(72) Inventors: Renqiang Min, Princeton, NJ (US); Yang Gao, Salt Lake City, UT (US); Eric Cosatto, Red Bank, NJ (US)

(73) Assignee: NEC Corporation, Tokyo (JP)

( * ) Notice: Subject to any disclaimer, the term of this patent is extended or adjusted under 35 U.S.C. 154(b) by 259 days.

(21) Appl. No.: 15/479,408

(22) Filed: Apr. 5, 2017

(65) Prior Publication Data
US 2017/0293804 A1 Oct. 12, 2017

Related U.S. Application Data

(60) Provisional application No. 62/318,865, filed on Apr. 6, 2016.

(51) Int. Cl.
*G06K 9/00* (2006.01)
*G06N 3/04* (2006.01)
(Continued)

(52) U.S. Cl.
CPC ........ *G06K 9/00711* (2013.01); *G06K 9/4628* (2013.01); *G06K 9/6274* (2013.01);
(Continued)

(58) Field of Classification Search
CPC ............. G06K 9/00711; G06K 9/6274; G06K 9/4628; G06K 2009/00738; H04N 5/77;
(Continued)

(56) References Cited

U.S. PATENT DOCUMENTS

2008/0209343 A1* 8/2008 Macadaan ............. G06F 3/0482
715/747
2017/0150235 A1* 5/2017 Mei .................... H04N 21/8405
(Continued)

OTHER PUBLICATIONS

Xu, Zhen, Bingquan Liu, Baoxun Wang, Chengjie Sun, and Xiaolong Wang. "Incorporating loose-structured knowledge into LSTM with recall gate for conversation modeling." arXiv preprint arXiv:1605.05110 (2016). (Year: 2016).*

(Continued)

*Primary Examiner* — Carol Wang
(74) *Attorney, Agent, or Firm* — Joseph Kolodka (57) ABSTRACT

A method, a computer program product, and a system are provided for video based action recognition. The system includes a processor. One or more frames from one or more video sequences are received. A feature vector for each patch of the one or more frames is generated using a deep convolutional neural network. An attention factor for the feature vectors is generated based on a within-frame attention and a between-frame attention. A target action is identified using a multi-layer deep long short-term memory process applied to the attention factor, said target action representing at least one of the one or more video sequences. An operation of a processor-based machine is controlled to change a state of the processor-based machine, responsive to the at least one of the one or more video sequences including the identified target action.

18 Claims, 8 Drawing Sheets

(51) Int. Cl.
  *G08B 13/196* (2006.01)
  *H04N 5/77* (2006.01)
  *H04N 7/18* (2006.01)
  *G06K 9/46* (2006.01)
  *G06K 9/62* (2006.01)

(52) U.S. Cl.
  CPC ......... *G06N 3/04* (2013.01); *G08B 13/19695* (2013.01); *H04N 5/77* (2013.01); *H04N 7/183* (2013.01); *G06K 2009/00738* (2013.01); *G08B 13/19613* (2013.01)

(58) Field of Classification Search
  CPC .............. H04N 7/183; G08B 13/19695; G08B 13/19613; G06N 3/04
  See application file for complete search history.

(56) References Cited

U.S. PATENT DOCUMENTS

2017/0255832 A1* 9/2017 Jones ................. G06K 9/00718
2017/0262996 A1* 9/2017 Jain .......................... G06T 7/143

OTHER PUBLICATIONS

Wang et al., "Action Recognition by Dense Trajectories", Computer Vision and Pattern Recognition (CVPR), Jun. 2011, pp. 3169-3716.
Sharma et al., "Action Recognition Using Visual Attention", Workshop track—ICLR 2016, arXiv Feb. 2016, pp. 1-11.

* cited by examiner

DEEP 3D ATTENTION LONG SHORT-TERM MEMORY FOR VIDEO-BASED ACTION RECOGNITION

RELATED APPLICATION INFORMATION

This application claims priority to U.S. Provisional Patent Application Ser. No. 62/318,865 filed on Apr. 6, 2016, incorporated herein by reference in, its entirety. Moreover, this application is related to commonly assigned U.S. patent application Ser. No. 15/479,430, filed concurrently herewith and incorporated herein by reference.

BACKGROUND

Technical Field

The present invention generally relates to video-based recognition and more particularly to video-based action recognition in a monitoring system.

Description of the Related Art

Video-based action recognition is the most valuable component of intelligent monitoring systems for many applications such as public safety monitoring, shopping center and factory surveillance, and home security etc. Real-time action recognition based on video sequences produced by surveillance cameras not only detects the type of action of interest, but also detects the start and end of the searched action, which often contains a sequence of action progression stages or sub-actions, as well as the most relevant time-dependent regions within video frames.

Previous approaches to action recognition mainly fall into the following two categories: A) Feature engineering based on individual video frames by handcrafting features from each video frame and tracking them based on displacement information from an optical flow field, and B) Machine learning approaches without considering complex long-range temporal dependencies by extracting features using convolutional neural networks (CNNs) or recurrent neural networks (RNNs), and then using standard classifiers or RNNs for action prediction without attention or with only between-frame attention.

SUMMARY

According to an aspect of the present principles, a computer-implemented method is provided for video based action recognition. The method includes receiving, by a processor, one or more frames from one or more video sequences. The method further includes generating, by the processor using a deep convolutional neural network, a feature vector for each patch of the one or more frames. The method also includes generating, by the processor, an attention factor for the feature vectors based on a within-frame attention and a between-frame attention. The method additionally includes identifying, by the processor, a target action using a multi-layer deep long short-term memory process applied to the attention factor, said target action representing at least one of the one or more video sequences. The method also includes controlling an operation of a processor-based machine to change a state of the processor-based machine, responsive to the at least one of one or more video sequences including the identified target action.

According to another aspect of the present principles, a computer program product is provided for video based action recognition. The computer program product includes a non-transitory computer readable storage medium having program instructions embodied therewith. The program instructions are executable by a computer to cause the computer to perform a method. The method includes receiving, by a processor, one or more frames from one or more video sequences. The method further includes generating, by the processor using a deep convolutional neural network, a feature vector for each patch of the one or more frames. The method also includes generating, by the processor, an attention factor for the feature vectors based on a within-frame attention and a between-frame attention. The method additionally includes identifying, by the processor, a target action using a multi-layer deep long short-term memory process applied to the attention factor, said target action representing at least one of the one or more video sequences. The method also includes controlling an operation of a processor-based machine to change a state of the processor-based machine, responsive to the at least one of one or more video sequences including the identified target action.

According to yet another aspect of the present principles, a system is provided for video based action recognition. The system includes a processor. The processor is configured to receive one or more frames from one or more video sequences. The processor is further configured to generate, using a deep convolutional neural network, a feature vector for each patch of the one or more frames. The processor is additionally configured to generate an attention factor for the feature vectors based on a within-frame attention and a between-frame attention. The processor is also configured to identify a target action using a multi-layer deep long short-term memory process applied to the attention factor, said target action representing at least one of the one or more video sequences. The processor is further configured to control an operation of a processor-based machine to change a state of the processor-based machine, responsive to the at least one of the one or more video sequences including the identified target action.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A system using Deep 3D attention Long Short-Term Memory for video based action recognition is presented. Unlike previous approaches, this system is capable of capturing long-range complex temporal dependencies in long video sequences with both between-frame and within-frame attention. This system uses a novel objective function enabling users to easily identify key video segments for target actions. Target actions may include an intruder entering a restricted area, a confined animal escaping an enclosure, or a piece of machinery malfunctioning and endangering people or property in the machineries vicinity, etc. It is to be understood that the target actions listed and described herein are only illustrative of the principles of the present invention and that those skilled in the art may implement various modifications without departing from the scope and spirit of the invention.

Figure 1:
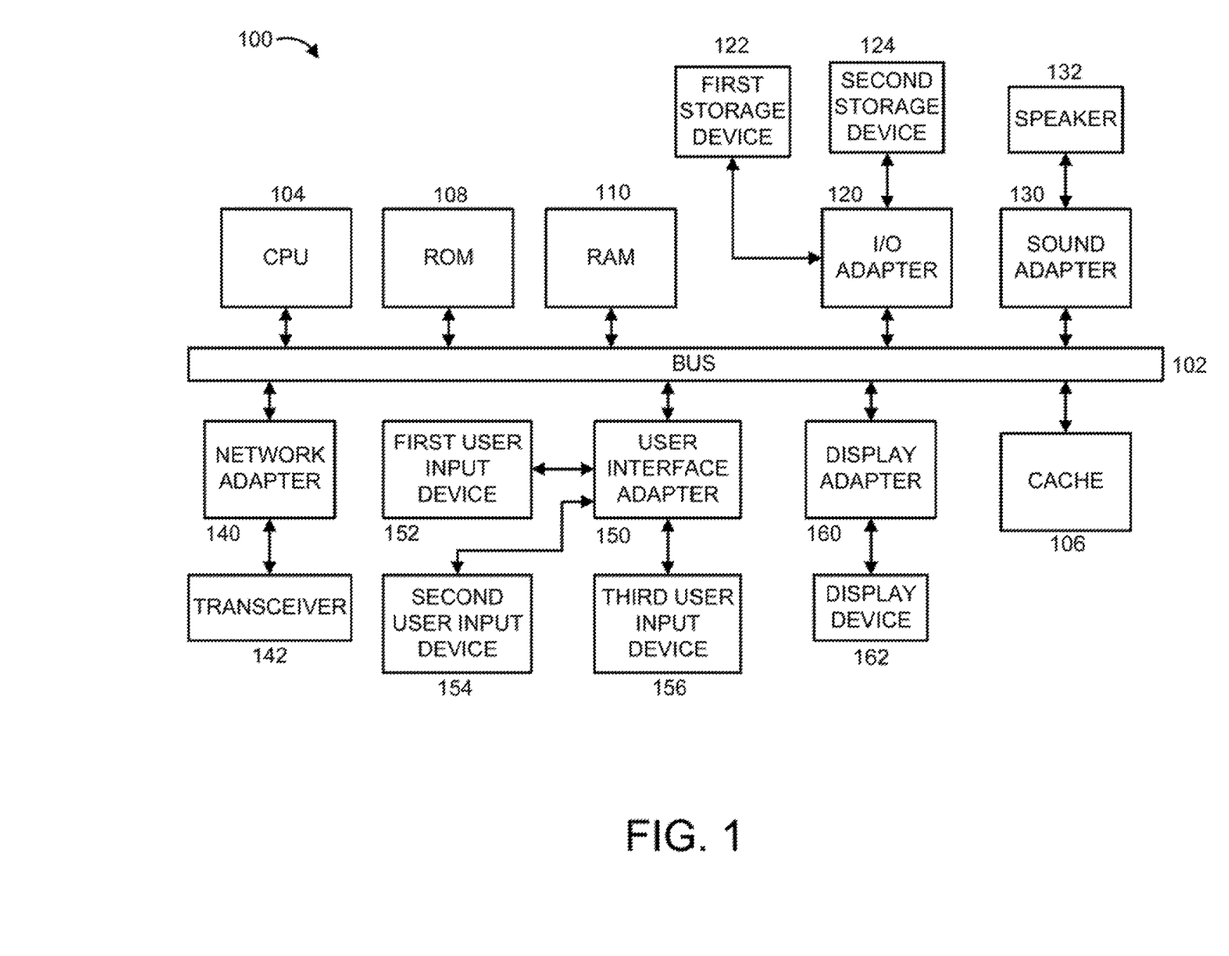
FIG. 1 shows a block diagram of an exemplary processing system to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to the present invention. A transceiver 142 is operatively coupled to system bus 102 by network adapter 140, A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and or output devices can be included in processing system 100, depending upon the particular implementation of the same, as readily understood by one of ordinary skill in the an. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
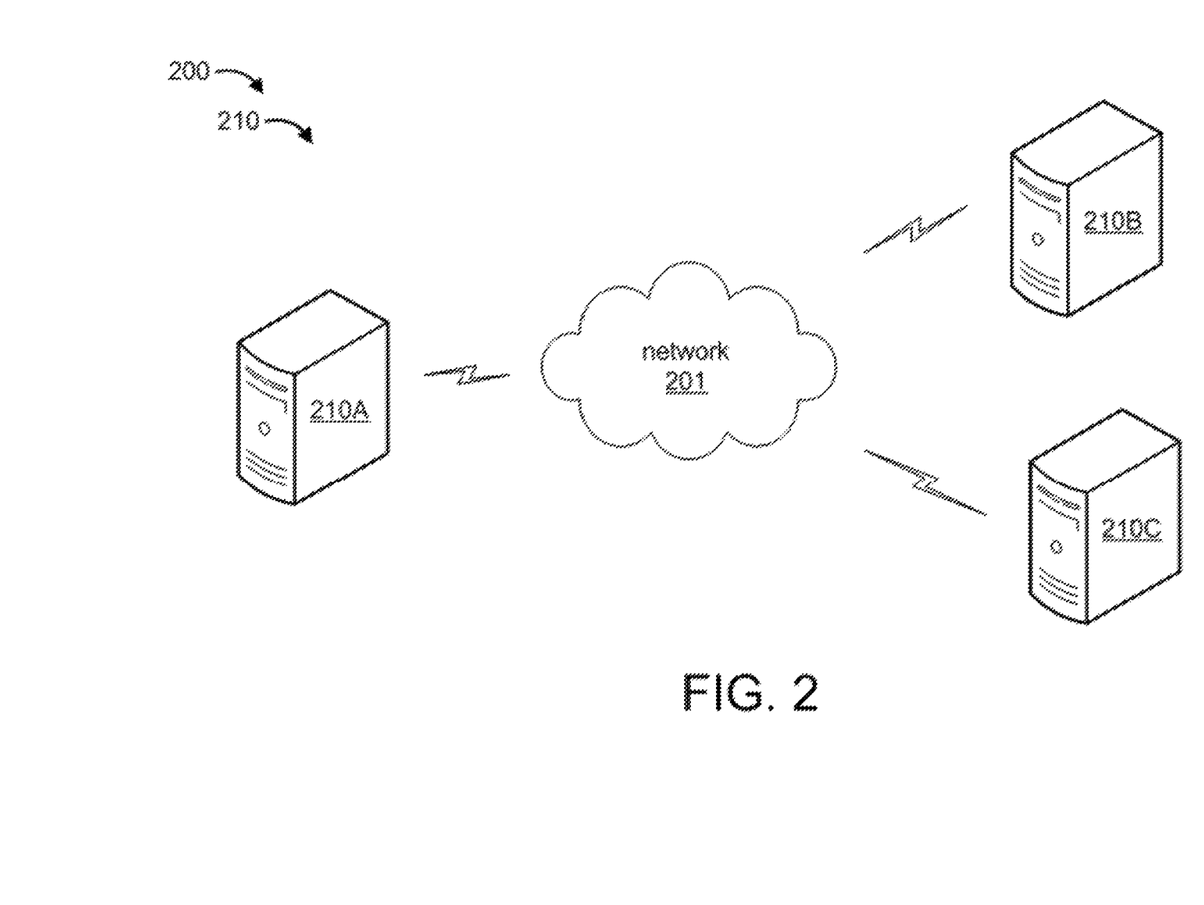
FIG. 2 shows a block diagram of an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
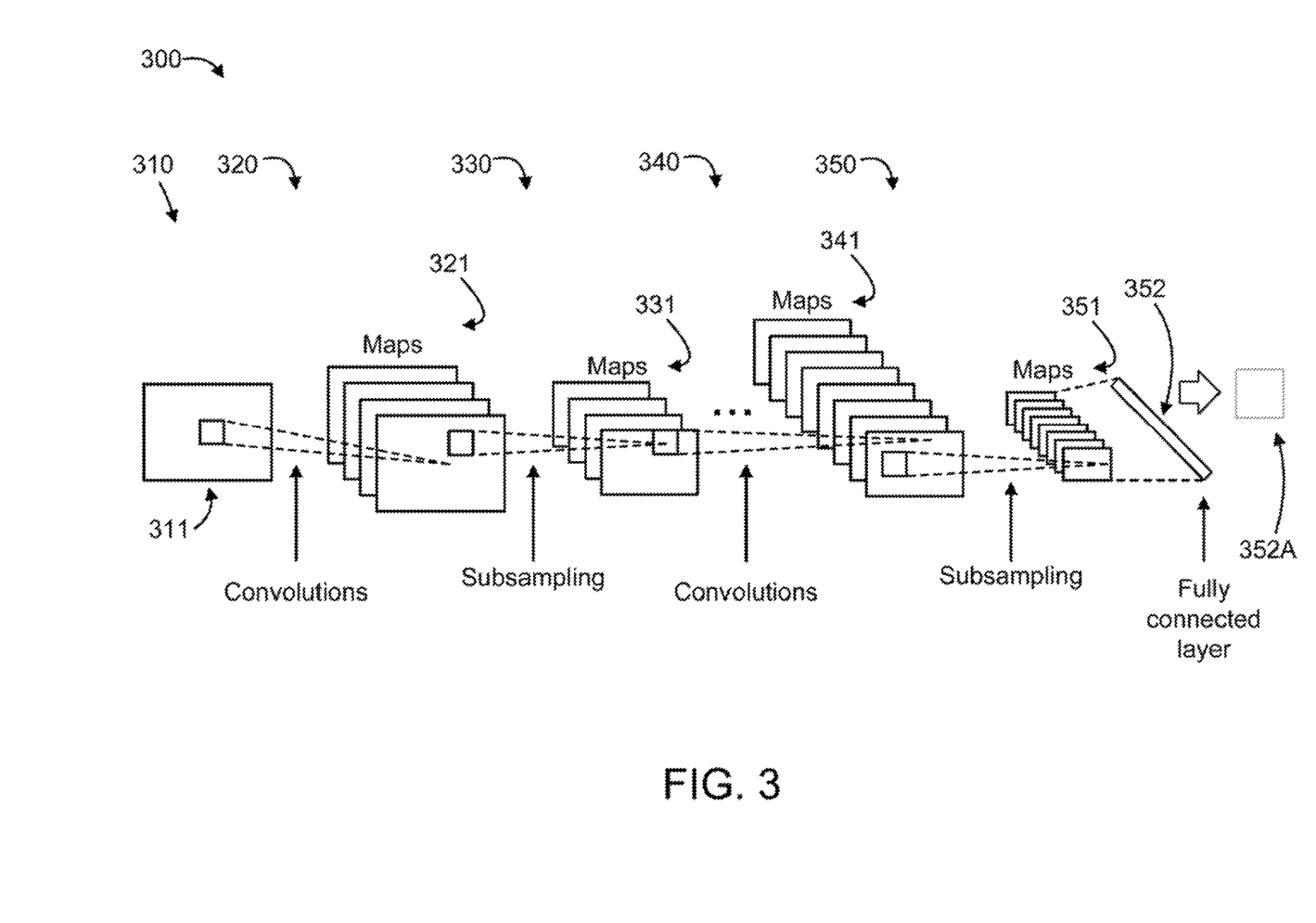
FIG. 3 shows a high-level block/flow diagram of an exemplary high-order convolutional neural network method, in accordance with an embodiment of the present invention.
Figure 4:
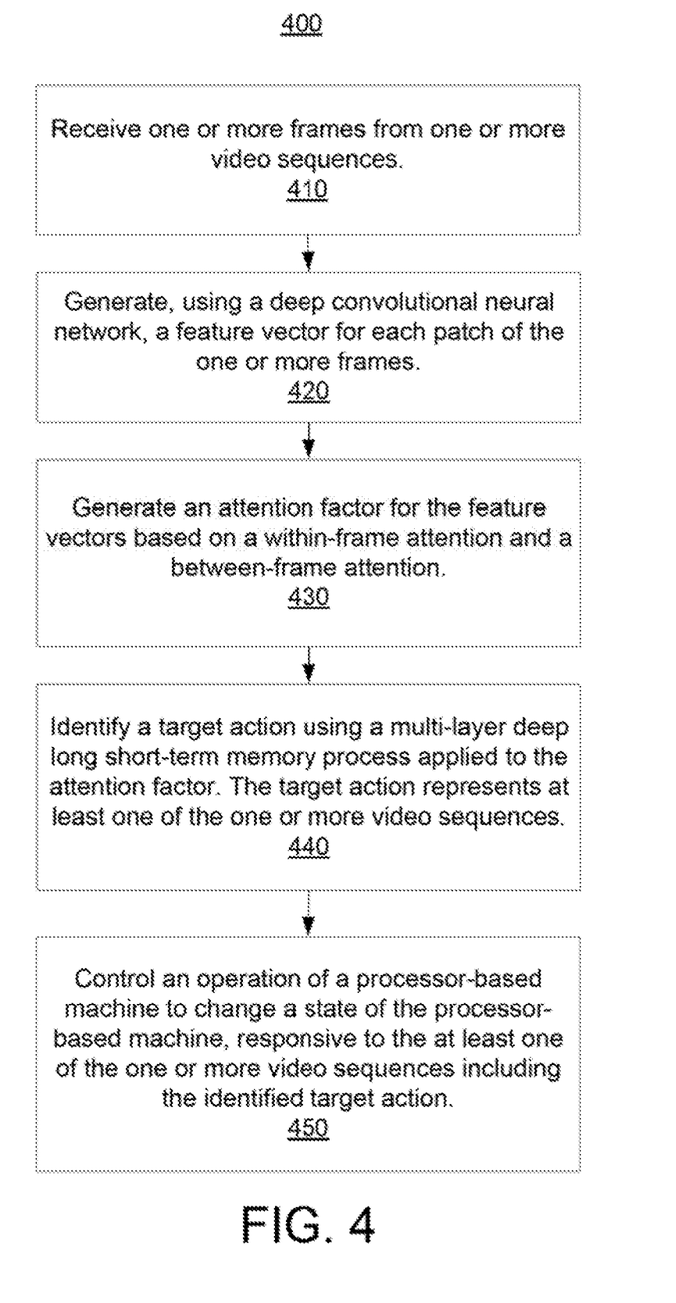
FIG. 4 is a flow diagram illustrating a method for video based action recognition, in accordance with an embodiment of the present invention.
Figure 5:
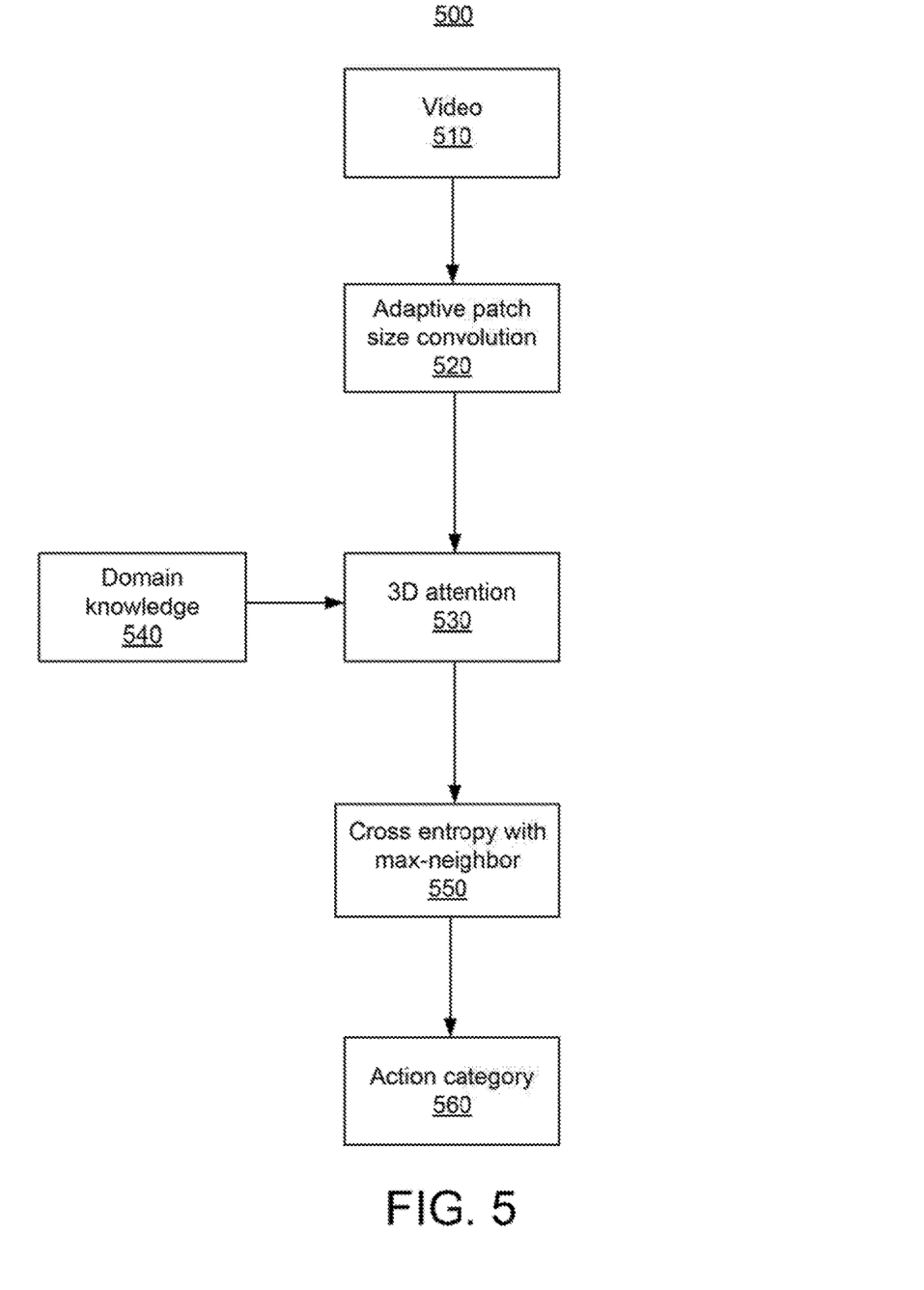
FIG. 5 shows a high-level block/flow diagram of a deep 3D attention recurrent neural network method, in accordance with an embodiment of the present invention.
Figure 6:
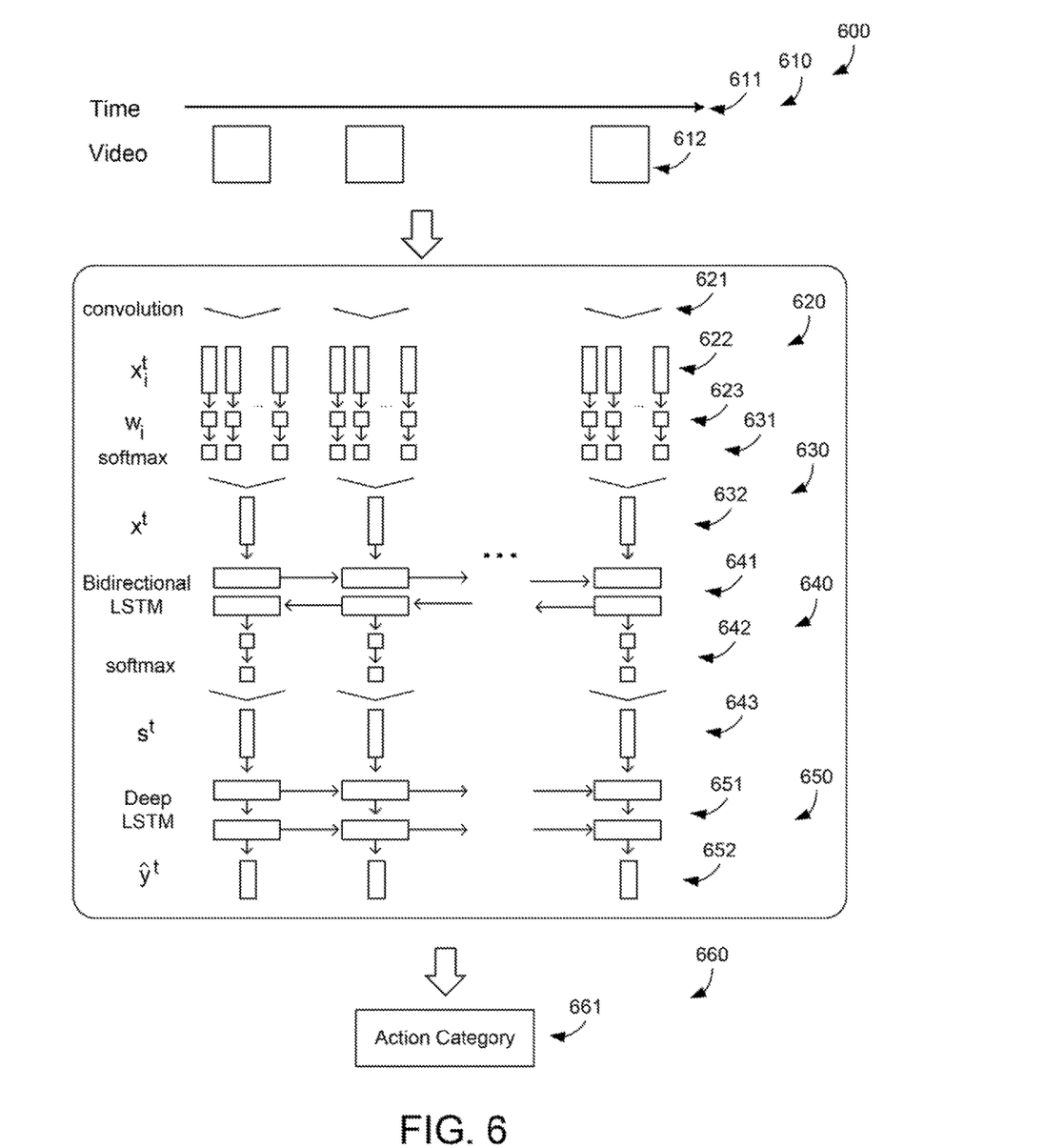
FIG. 6 shows a block/flow diagram of a deep 3D attention recurrent neural network method, in accordance with an embodiment of the present invention.
Figure 8:
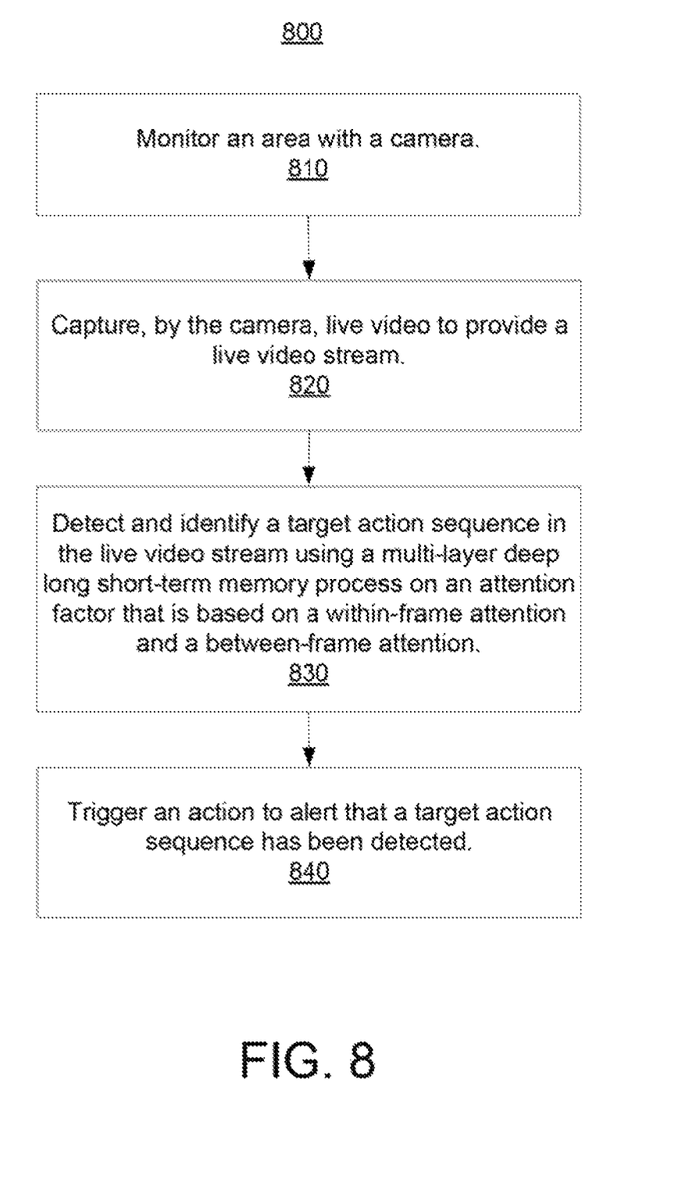
FIG. 8 is a flow diagram illustrating a method for video monitoring, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 600 of FIG. 6 and/or at least part of method 800 of FIG. 8. Similarly, part or all of system 200 may be used to perform at least part of method 300 of FIG. 3 and/or at least pan of method 400 of FIG. 4 and/or at least part of method 500 of FIG. 5 and/or at least part of method 600 of FIG. 6 and/or at least part of method 800 of FIG. 8.

FIG. 2 shows an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 at least includes a set of computer processing systems 210. The computer processing systems 210 can be any type of computer processing system including, but not limited to, servers, desktops, laptops, tablets, smart phones, media playback devices, and so forth. For the sake of illustration, the computer processing systems 210 include server 210A, server 210B, and server 210C.

In an embodiment, the present invention performs a deep 3D attention recurrent neural network method for any of the computer processing systems 210. Thus, any of the computer processing systems 210 can perform video analysis that can be stored in, or accessed by, any of the computer processing systems 210. Moreover, the output (including active video segments) of the present invention can be used to control other systems and/or devices and/or operations and/or so forth, as readily appreciated by one of ordinary skill in the art given the teachings of the present invention provided herein, while maintaining the spirit of the present invention.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs) Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows a high-level block/flow diagram of an exemplary high-order convolutional neural network method 300, in accordance with an embodiment of the present invention.

At step 310, receive an input image 311.

At step 320, perform convolutions on the input image 311 to obtain maps 321.

At step 330, perform sub-sampling on the high-order feature maps 321 to obtain a set of maps 331.

At step 340, perform convolutions on the set of maps 331 to obtain another set of maps 341.

At step 350, perform sub-sampling on the other set of maps 341 to obtain yet another set of maps 351 that form a fully connected layer 352. The fully connected layer 352 provides a feature vector 352A.

It is to be appreciated that the neurons in the fully connected layer 352 have full connections to all activations in the previous layer. Their activations can hence be computed with a matrix multiplication followed by a bias offset.

We can optionally have more fully connected layers rather than just 352 and more repeated steps of 320 and 330 rather than just 340 and 350 depending on different tasks.

It is to be further appreciated that while a single image is mentioned with respect to step 310, multiple images such as in the case of one or more video sequences can be input and processed in accordance with the method 300 of FIG. 3, while maintaining the spirit of the present invention.

Referring to FIG. 4, a flow chart for a video based action recognition method 400 is illustratively shown, in accordance with an embodiment of the present invention. In block 410, receive one or more frames from one or more video sequences. In block 420, generate, using a deep convolutional neural network, a feature vector for each patch of the one or more frames. In block 430, generate an attention factor for the feature vectors based on a within-frame attention and a between-frame attention. In block 440, identify a target action using a multi-layer deep long short-term memory process applied to the attention factor. The target action represents at least one of the one or more video sequences, in block 450, control an operation of a processor-based machine to change a state of the processor-based machine, responsive to the at least one of the one or more video sequences including the identified target action.

Deep 3D attention Long Short-Term Memory (LSTM) may contain multiple modules. In one embodiment, the Deep 3D attention LTSM may include an input module. The input module may be a deep, convolutional neural network (CNN). For each time frame at time point t, the output of the last convolutional layer is utilized, which contains K patches and each patch is a D dimensional feature vector. The output of this module is a set of features $x_i^t \in \mathbb{R}^D$, where $t \in \{1, \ldots, T\}$ is the time point index of the frame and $i \in \{1, \ldots, K\}$ is the index of the patch. The convolution patch size is a learnable non-fixed parameter.

In another embodiment, the Deep 3D attention LTSM may include an attention module. The attention module may contain within-frame attention and between-frame attention, and each could either be a hard or a soft attention. Hard attention assesses certain aspects of the frame one feature at a time and aggregates the information. Soft attention assesses the frame by concentrating on certain key features based on all the features. The within-frame soft attention weight $\alpha_i^t$ for patch i of frame t is achieved by:

$$\alpha_i^t = \mathrm{softmax}(w_i^T x_i^t),$$

where $w_i \in \mathbb{R}^D$, $x_i^t$ is the feature representation of patch i of frame t generated by the deep CNN, $i \in \{1, \ldots, K\}$ are learnable parameters and $\mathrm{softmax}(z_i) = e^{z_i}/\Sigma_j e^{z_j}$. Applying the within-frame level attention gives the between-frame level attention's input:

$$x^t = \Sigma_{i=1}^{K} \alpha_i^t x_i^t.$$

Other options for within-frame level attention could be multilayer perceptron (MLP) followed by a softmax layer. For between-frame soft attention, we use bidirectional LSTMs with:

$$\vec{h}^t, \vec{c}^t = \mathrm{LSTM}_{fwd}(x^t, \vec{h}^{t-1}, \vec{c}^{t-1}),$$

$$\overleftarrow{h}^t, \overleftarrow{c}^t = \mathrm{LSTM}_{bwd}(x^t, \overleftarrow{h}^{t+1}, \overleftarrow{c}^{t+1}),$$

$$h^t = \vec{h}^t \overleftarrow{h}^t,$$

where $x^t$ is the output of the within-frame attention at time point t, $\vec{h}^t, \vec{c}^t$ are the hidden state and the cell state of the forward LSTM at time point t, $\overleftarrow{h}^t, \overleftarrow{c}^t$ are the hidden state and cell state of the backward LSTM at time point t, $h^t$ is the final hidden state which contains information from both the future and the past. Given the bandwidth L (i.e. a free parameter) of between-frame attention, the between-frame attention could be calculated with:

$$\beta^t = \frac{a^{iT} h^t}{\sum_{j=t-L}^{t+L} a^{jT} h^j},$$

where $\alpha^t \in \mathbb{R}^M$ are learnable parameters and M is the hidden state dimension in LSTM. The final 3D attention module output, or attention factor, at time point t is:

$$s^t = \Sigma_{j=t-L}^{t+L} \beta^j \Sigma_{i=1}^{K} \alpha_i^j x_i^j.$$

In yet another embodiment, the Deep 3D attention LTSM may include an output module. The output module may apply a multi-layers deep LSTM to produce $q^t \in \mathbb{R}^C$, there C is the number of action classes. The final output being:

$$\hat{y}_c^t = \mathrm{softmax}\left(\frac{1}{2L+1} \sum_{j=t-L}^{t+L} q_c^j\right).$$

In still another embodiment, the Deep 3D attention LTSM may include a domain knowledge module. The domain knowledge module may be achieved by embedding a target or additional knowledge followed by a dot product with the output of the input module.

The cross-entropy loss function has three choices (N is the number of samples), and the training is performed by back-prorogation:

To use the last time point:

$$\mathcal{L} = -\Sigma_{i=1}^{N} \Sigma_{c=1}^{C} y_c \log \hat{y}_c^T;$$

To use all time points:

$$\mathcal{L} = -\Sigma_{i=1}^{N} \Sigma_{t=1}^{T} \Sigma_{c=1}^{C} y_c \log \hat{y}_c^t;$$

To use the maximum probability's time point (max-neighbor):

$$\mathcal{L} = -\Sigma_{i=1}^{N} \Sigma_{c=1}^{C} y_c \log(\max_{t=1}^{T}(\hat{y}_c^T)).$$

FIG. 5 shows a high-level block/flow diagram of a deep 3D attention recurrent neural network method 500, in accordance with an embodiment of the present invention. The deep 3D attention recurrent neural network method 500 may include a video 510 (with one embodiment used in step 610 in FIG. 6) to supply the video frames analysed in the deep 3D attention recurrent neural network method 500. The video 510 may be fed into an adaptive patch size convolution network 520 (with one embodiment used in step 620 in FIG. 6) to be produce vectors representing the frames of the video. In one embodiment, the adaptive patch size convolution network 520 may function as the input module as described above in the Deep 3D attention LTSM.

The deep 3D attention recurrent neural network method 500 may include a domain knowledge process 540. The domain know ledge process 540 may embed additional knowledge with a dot product of the vectors produced by the adaptive patch size convolution network 520. In one embodiment, the domain knowledge process 540 may function as the domain knowledge module as described above in the Deep 3D attention LTSM.

The deep 3D attention recurrent neural network method 500 may include a 3D attention process 530 (with one embodiment used in steps 630 and 640 in FIG. 6). In one embodiment, the 3D attention process may take the vectors from the adaptive patch size convolution network 520 to produce final 3D attention values. In another embodiment, the 3D attention process may take the vectors from the adaptive patch size convolution network 520 and the additional knowledge embedded by the knowledge domain process 540 to produce final 3D attention values. In yet another embodiment, the 3D attention process 530 may function as the attention module as described above in the Deep 3D attention LTSM.

The deep 3D attention recurrent neural network method 500 may include a cross entropy with max-neighbor process 550 (with one embodiment used in step 650 in FIG. 6). In one embodiment, the cross entropy with max-neighbor process 550 may apply a deep LSTM to the final 3D attention values from the 3D attention process 530 to produce the final output. In another embodiment, the cross entropy with max-neighbor process 550 may utilize a cross-entropy loss function as described above. In yet another embodiment, the cross entropy with max-neighbor process 550 may function as the output module as described above in the Deep 3D attention LTSM.

The deep 3D attention recurrent neural network method 500 may include an action category 560 (with one embodiment used in step 660 in FIG. 6). The action category 560 represents the action the deep 3D attention recurrent neural network method 500 detected from the video 510.

FIG. 6 shows a block/flow diagram of a deep 3D attention recurrent neural network method 600, in accordance with an embodiment of the present invention.

At step 610, receive video frames 612 over time 611.

At step 620, perform convolutions 621 on the video frames 612 to obtain a set of features 622 and a set of learnable parameters 623.

At step 630, perform softmax 631 on the set of features 622 and the set of learnable parameters 623 to obtain the within-frame level attention input 632.

At step 640, perform bidirectional LSTM 641 and softmax 642 on the within-frame level attention input 632 to obtain the 3D attention output 643.

At step 650, perform a deep LSTM 651 on the 3D attention output 643 to obtain the RNN output 652.

At step 660, passing the RNN output 652 into the action category 661.

Figure 7:
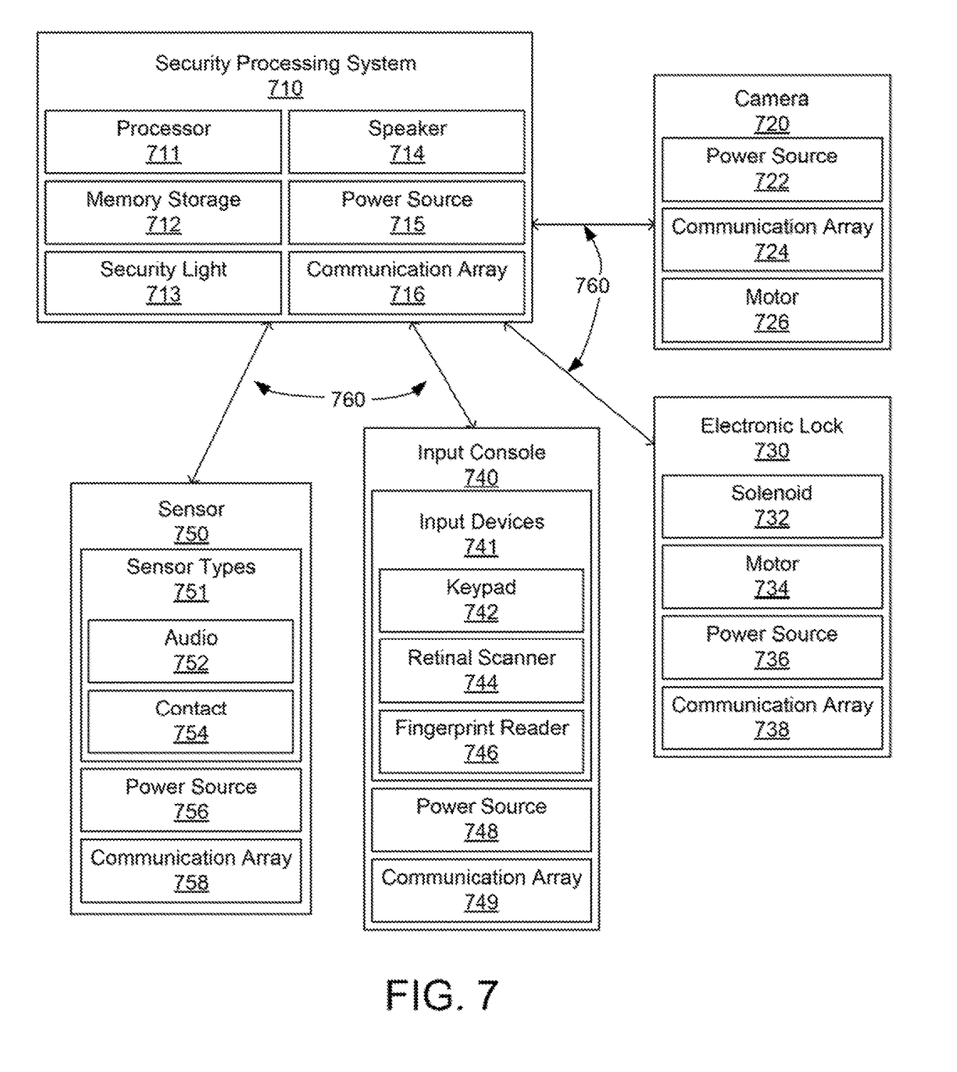
FIG. 7 shows a block/flow diagram of a video monitoring system, in accordance with an embodiment of the present invention.

The invention as described may be used in many different embodiments. One useful embodiment may have the invention in a video monitoring system. FIG. 7 shows a block/flow diagram of a video monitoring system 700, in accordance with an embodiment of the present invention. The video monitoring system 700 may include a security processing system 710. The security processing system 710 may include a processing system 100 from in FIG. 1. The security processing system 710 may be equipped with computing functions and controls. The security processing system 710 may include one or more processors 711 (hereafter "processor"). The security processing system 710 may include a memory storage 742. The memory storage 742 may include solid state or soft storage and work in conjunction with other devices of the video monitoring system 700 to record data, run algorithms or programs, store safety procedures, a deep 3D attention recurrent neural network, etc. The memory storage 712 may include a Read Only Memory (ROM), random access memory (RAM), or any other type of memory useful for the present applications.

The security processing system 710 may include a communication array 716 to handle communications between the different devices in the video monitoring system 700. In one embodiment, the communication array 716 may be equipped to communicate with a cellular network system. In this way, the security processing system 710 may contact a control center with information related to the status of the video monitoring system 700 and the property the system is securing. The communication array 716 may include a WIFI or equivalent radio system, a local area network (LAN), hardwired system, etc. The communication array 716 may provide the security processing system 710 a communication channel 760 with other devices in the video monitoring system 700.

The security processing system 710 may include a power source 715. The power source 715 may include or employ one or more batteries, a generator with liquid fuel (e.g., gasoline, alcohol, diesel, etc.) or other energy source. In another embodiment, the power source 715 may include one or more solar cells or one or more fuel cells. In another embodiment, the power source 715 may include power from the building with the video monitoring system 700. The security processing system 710 may have multiple sources in the power source 715. In one embodiment, the security processing system 710 may include power directly from the building and a battery system as a back-up to ensure the video monitoring system 700 stays active if a power interruption occurs.

The security processing system 71 may include a security light 713. The security light 713 may be illuminated when the security processing system 710 detects an intruder in the area of the security light 713 to deter the intruder or give investigators improved visibility in the area of the security light 713. The security processing system 710 may include a speaker 714. The speaker 714 may act as an alarm when the security processing system 710 detects an intruder in a secure area to deter the intruder or notify investigators of an intruder.

Of course, the security processing system 710 may also include other elements (not shown), as readily contemplated by one of skill in the art, as well as omit certain elements. For example, various other input devices and/or output devices can be included in the security processing system 710, depending upon the particular implementation of the same, as readily understood by one of ordinary skill in the art. For example, various types of wireless and/or wired input and/or output devices can be used. Moreover, additional processors, displays, controllers, memories, and so forth, in various configurations can also be utilized as readily appreciated by one of ordinary skill in the art. These and other variations of the security processing system 710 are readily contemplated by one of ordinary skill in the art given the teachings of the present invention provided herein.

The video monitoring system 700 may include a camera 720. The camera 720 may communicate through the communication channel 760 to the security processing system 710. The camera 720 may include a power source 722. The power source 722 may include or employ one or more batteries or other energy source. In another embodiment, the power source 722 may include one or more solar cells or one or more fuel cells. In another embodiment, the power source 722 may include power from the building with the video monitoring system 700. In yet another embodiment, the power source 722 may include power through the communication channel 760 linking the camera 720 to the security processing system 710. The camera 720 may have multiple sources in the power source 722. In one embodiment, the camera 720 may include power through the communication channel 760 and a battery system as a back-up to ensure the camera 720 stays active if a power interruption occurs.

The camera 720 may include a communication array 724 to handle communications between the camera 720 and the security processing system 710. In one embodiment, the communication array 724 may be equipped to communicate with a cellular network system. The communication array 724 may include a WIFI or equivalent radio system, a local area network (LAN), hardwired system, etc. The communication array 724 may connect the camera 720 to the security processing system 710 through the communication channel 760.

The camera 720 may include one or more motor 726. The motor 726 may physically move the camera 720, so the field of view covered by the camera 720 is greater than the field of view of the camera 720. The motor 726 may be used to zoom a lens in the camera 720 to get a zoomed in image of the area being covered by the camera 720. The motor 720 may be controlled by commands originating in the camera 720 or from commands originating in the security processing system 710.

Of course, the camera 720 may also include other elements (not shown), as readily contemplated by one of skill in the art, as well as omit certain elements. For example, various other lens or lights for night vision or infrared detection may be included in the camera 720, depending upon the particular implementation of the same, as readily understood by one of ordinary skill in the art.

The video monitoring system 700 may include an electronic lock 730. The electronic lock 730 may communicate through the communication channel 760 to the security processing system 710. The electronic lock 730 may include a power source 736. The power source 736 may include or employ one or more batteries or other energy source. In another embodiment, the power source 736 may include one or more solar cells or one or more fuel cells. In another embodiment, the power source 736 may include power from the building with the video monitoring system 700. In yet another embodiment, the power source 736 may include power through the communication channel 760 linking the electronic lock 730 to the security processing system 710. The electronic lock 730 may have multiple sources in the power source 736. In one embodiment, the electronic lock 730 may include power through the communication channel 760 and a battery system as a back-up to ensure the electronic lock 730 stays active if a power interruption occurs.

The electronic lock 730 may include a communication array 738 to handle communications between the electronic lock 730 and the security processing system 710. In one embodiment, the communication array 738 may be equipped to communicate with a cellular network system. The communication array 738 may include a WIFE or equivalent radio system, a local area network (LAN), hardwired system, etc. The communication array 738 may connect the electronic lock 730 to the security processing system 710 through the communication channel 760.

The electronic lock 730 may include a motor 734. The motor 734 may physically actuate a bolt in the electronic lock 730. In one embodiment, the motor 734 actuates one or more bolts along a door to lock the door. In another embodiment, the motor 734 may actuate a hook in a window to lock the window. The motor 734 may be controlled by commands originating in the electronic lock 730 or from commands originating in the security processing system 710.

The electronic lock 730 may include a solenoid 732. The solenoid 732 may physically actuate a bolt in the electronic lock 730. In one embodiment, the solenoid 732 actuates one or more bolts along a door to lock the door. In another embodiment, the solenoid 732 may actuate a hook in a window to lock the window. The solenoid 732 may be controlled by commands originating in the electronic lock 730 or from commands originating in the security processing system 710.

Of course, the electronic lock 730 may also include other elements (not shown), as readily contemplated by one of skill in the art, as well as omit certain elements. For example, various other engaging mechanisms may be included in the electronic lock 730, depending upon the particular implementation of the same, as readily understood by one of ordinary skill in the art.

The video monitoring system 700 may include an input console 740. The input console 740 may communicate through the communication channel 760 to the security processing system 710. The input console 740 may include a power source 748. The power source 748 may include or employ one or more batteries or other energy source. In another embodiment, the power source 748 may include one or more solar cells or one or more fuel cells. In another embodiment, the power source 748 may include power from the building with the video monitoring system 700. In yet another embodiment, the power source 748 may include power through the communication channel 760 linking the input console 740 to the security processing system 710. The input console 740 may have multiple sources in the power source 748. In one embodiment, the input console 740 may include power through the communication channel 760 and a battery system as a back-up to erasure the input console 740 stays active if a power interruption occurs.

The input console 740 may have one or more input devices 741. The input devices 741 may include a keypad 742, a retinal scanner 744, or a fingerprint reader 746. The input console 740 may include more than one of the input devices 741. In one embodiment, the input console 740 may include a keypad 742 and a fingerprint reader 746 to support two-factor authentication. In one embodiment, the input console 740 may include a keypad 742, a retinal scanner 744, and a fingerprint reader 744 to support three-factor authentication.

The input console 740 may include a communication array 749 to handle communications between the input console 740 and the security processing system 710. In one embodiment, the communication array 749 may be equipped to communicate with a cellular network system. The communication array 749 may include a WIFI or equivalent radio system, a local area network (LAN), hardwired system, etc. The communication array 749 may connect the input console 740 to the security processing system 710 through the communication channel 760.

Of course, the input console 740 may also include other elements (not shown), as readily contemplated by one of skill in the art, as well as omit certain elements. For example, various other input devices may be included in the input console 740, such as a camera for facial recognition, depending upon the particular implementation of the same, as readily understood by one of ordinary skill in the art.

The video monitoring system 700 may include one or more sensors 750 (hereafter "sensor"). The sensor 750 may communicate through the communication channel 760 to the security processing system 710. The sensor 750 may include a power source 756. The power source 756 may include or employ one or more batteries or other energy source. In another embodiment, the power source 756 may include one or more solar cells or one or more fuel cells. In another embodiment, the power source 756 may include power from the building with the video monitoring system 700. In yet another embodiment, the power source 756 may include power through the communication channel 760 linking the sensor 750 to the security processing system 710. The sensor 750 may have multiple sources in the power source 756. In one embodiment, the sensor 750 may include power through the communication channel 760 and a battery system as a back-up to ensure the input console 740 stays active if a power interruption occurs.

The sensor 750 may have one or more sensor types 751. The sensor types 751 may include audio 752 or contact 754. The sensor 750 may include more than one of the sensor types 751. In one embodiment, the sensor 750 may include an audio 752 and a contact 754. This embodiment may secure a window being able to detect when the window is closed with the contact 754 and being able to detect if broken with the audio 752.

The sensor 750 may include a communication array 758 to handle communications between the sensor 750 and the security processing system 710. In one embodiment, the communication array 758 may be equipped to communicate with a cellular network system. The communication array 758 may include, a WIFI or equivalent radio system, a local area network (LAN), hardwired system, etc. The communication array 758 may connect the sensor 750 to the security processing system 710 through the communication channel 760.

Of course, the sensor 750 may also include other elements (not shown), as readily contemplated by one of skill in the art, as well as omit certain elements. For example, various other types of sensors may be included in the sensor 750, such as a temperature sensor for detecting body heat, depending upon the particular implementation of the same, as readily understood by one of ordinary skill in the art.

The security processing system 710 may take video from the camera 720 to monitor the area being secured by the video monitoring system 700. The security processing system 710 may recognize action in the video that is outside a normal criteria. This action may include an intruder running up to the premises or a projectile approaching the premises. In one embodiment, the security processing system 710 may actuate the electronic locks 730 on the premises to secure the premises while sounding an alarm over the speaker 714 and turning on the security light 713. The security processing system 710 may also clip the video of the action sequence and send it to a security monitoring station or the home owner to have evidence of the intrusion or both. In another embodiment, the security processing system 710 may actuate the motor 734 in the electric lock 730 to close and lock windows when the action recognized is rain. Many other actions can be recognized with the present system, with different actions having different responses. In one embodiment, the security processing system 710 may use the electronic lock 730 to secure a pet door when the video shows a raccoon approaching the pet door.

Moreover, it is to be appreciated that video monitoring system 700 may perform at least part of the method described herein including, for example, at least part of method 300 of FIG. 3 and/or at least part of method 400 of FIG. 4 and/or at least part of method 500 of FIG. 5 and/or at least part of method 600 of FIG. 6 and/or at least part of method 800 of FIG. 8.

Referring to FIG. 8, a flow chart for a video monitoring method 800 is illustratively shown, in accordance with an embodiment of the present invention. In block 810, monitor an area with a camera. In block 820, capture, by the camera, live video as to provide a live video stream. In block 830, detect and identify a target action sequence in the live video stream using a multi-layer deep long short-term memory process on an attention factor that is based on a within-frame attention and a between-frame attention. In block 840, trigger an action to alert that a target action sequence has been detected.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in ever respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims:

What is claimed is:
1. A computer-implemented method for video based action recognition, the method comprising:
  receiving, by a processor, one or more frames from one or more video sequences;
  generating, by the processor using a deep convolutional neural network, a feature vector for each patch of the one or more frames;
  updating the feature vectors with a domain knowledge infusion of a target action class corresponding to a target action by dot product;
  generating, by the processor, an attention factor for the feature vectors based on a within-frame attention and a between-frame attention;
  identifying, by the processor, the target action using a multi-layer deep long short-term memory process applied to the attention factor, said target action representing at least one of the one or more video sequences; and
  controlling an operation of a processor-based machine to change a state of the processor-based machine, responsive to the at least one of one or more video sequences including the identified target action.

2. The computer-implemented method of claim 1, wherein the within-frame attention and the between-frame attention use at least one of a softmax layer and a bidirectional long short-term memory process.

3. The computer-implemented method of claim 1, wherein the within-frame attention and the between-frame attention include an attention selected from the group consisting of a hard attention and a soft attention.

4. The computer-implemented method of claim 1, wherein the target action is selected from a group of action classes.

5. The computer-implemented method of claim 1, wherein the long short-term memory process includes both hidden states and cell states.

6. The computer-implemented method of claim 5, wherein the hidden states are in a hidden state dimension.

7. The computer-implemented method of claim 1, wherein the multi-layer deep long short-term memory process utilizes a cross-entropy loss function.

8. The computer-implemented method of claim 7, wherein the cross-entropy loss function includes a function selected from the group consisting of a last time point cross-entropy loss function, an all-time point cross-entropy loss function, and a max-neighbor cross-entropy loss function.

9. The computer-implemented method of claim 1, wherein the within-frame attention includes a multilayer perceptron feeding into a softmax layer.

10. A computer program product for video based action recognition, the computer program product comprising a non-transitory computer readable storage medium having program instructions embodied therewith, the program instructions executable by a computer to cause the computer to perform a method comprising:
  receiving, by a processor, one or more frames from one or more video sequences;
  generating, by the processor using a deep convolutional neural network, a feature vector for each patch of the one or more frames;
  updating the feature vectors with a domain knowledge infusion of a target action class corresponding to a target action by dot product;
  generating, by the processor, an attention factor for the feature vectors based on a within-frame attention and a between-frame attention;
  identifying, by the processor, the target action using a multi-layer deep long short-term memory process applied to the attention factor, said target action representing at least one of the one or more video sequences; and controlling an operation of a processor-based machine to change a state of the processor-based machine, responsive to the at least one of the one or more video sequences including the identified target action.

11. The computer program product of claim 10, wherein the within-frame attention includes a multilayer perceptron feeding into a softmax layer.

12. The computer program product of claim 10, wherein the within-frame attention and the between-frame attention include an attention selected from the group consisting of a hard attention and a soft attention.

13. The computer program product of claim 10, wherein the target action is selected from a group of action classes.

14. The computer program product of claim 10, wherein the within-frame attention and the between-frame attention use at least one of a softmax layer and a bidirectional long short-term memory process.

15. The computer program product of claim 10, wherein the long short-term memory process includes both hidden states and cell states.

16. The computer program product of claim 15, wherein the hidden states are in a hidden state dimension.

17. The computer program product of claim 10, wherein the within-frame attention and the between-frame attention use at least one of a softmax layer and a bidirectional long short-term memory process.

18. A system for video based action recognition, the system comprising:
a processor, configured to:
receive one or more frames from one or more video sequences;
generate, using a deep convolutional neural network, a feature vector for each patch of the one or more frames;
update the feature vectors with a domain knowledge infusion of a target action class corresponding to a target action by dot product;
generate an attention factor for the feature vectors based on a within-frame attention and a between-frame attention;
identify the target action using a multi-layer deep long short-term memory process applied to the attention factor, said target action representing at least one of the one or more video sequences; and
control an operation of a processor-based machine to change a state of the processor-based machine, responsive to the at least one of the one or more video sequences including the identified target action.

* * * * *